July 31, 1962     I. J. WHITE ET AL     3,046,642
AUTOMATIC KEY CHAIN ASSEMBLY APPARATUS Filed June 15, 1960     6 Sheets-Sheet 2

INVENTORS
ISAAC J. WHITE
PAUL C. MARTIN

BY Cushman, Darby & Cushman

ATTORNEYS

July 31, 1962 I. J. WHITE ET AL 3,046,642
AUTOMATIC KEY CHAIN ASSEMBLY APPARATUS
Filed June 15, 1960 6 Sheets-Sheet 3

INVENTORS
ISAAC J. WHITE
PAUL C. MARTIN
BY Cushman, Darby & Cushman
ATTORNEYS

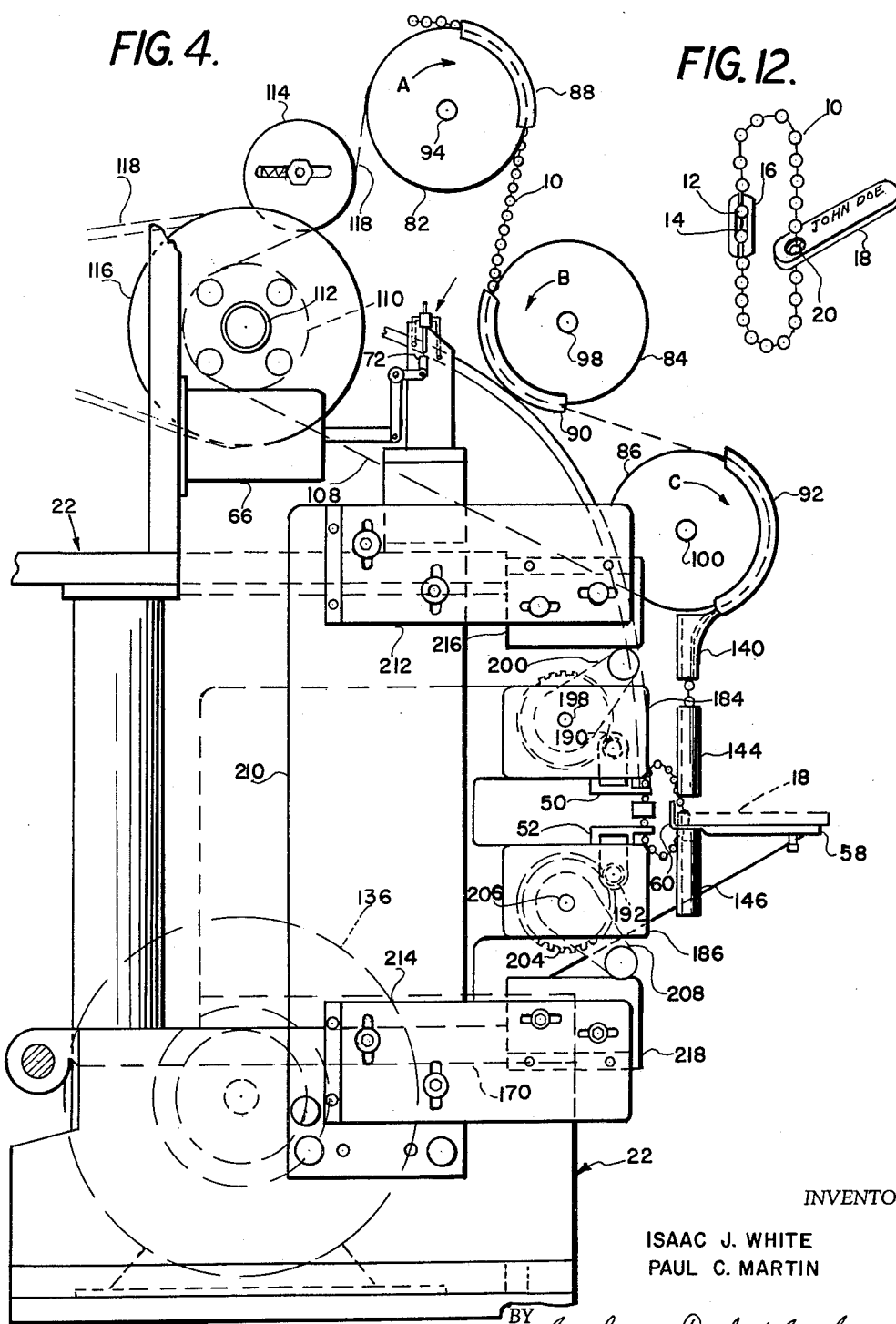

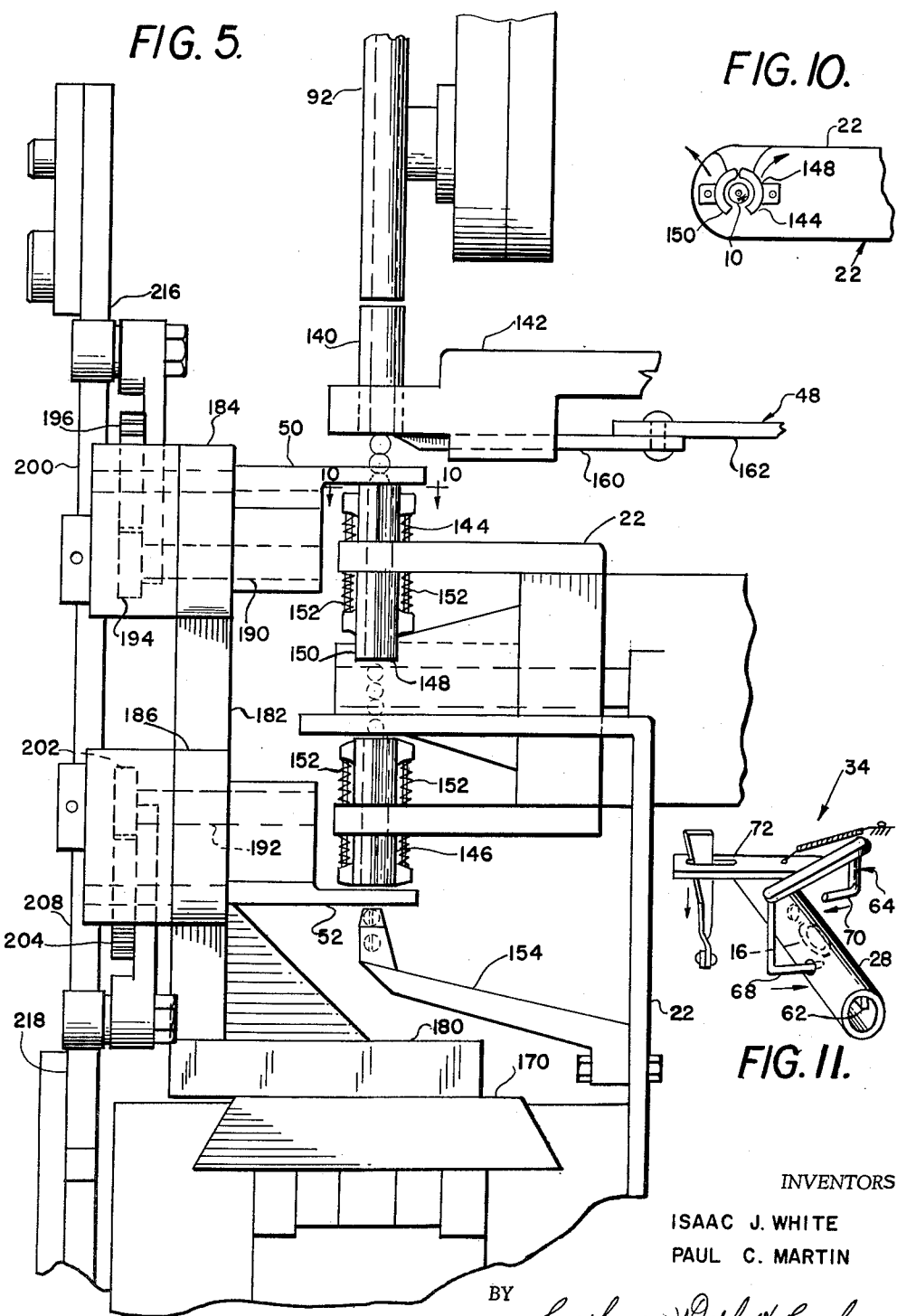
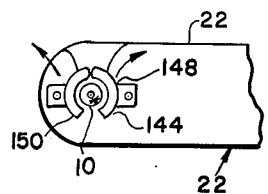

July 31, 1962 I. J. WHITE ET AL 3,046,642
AUTOMATIC KEY CHAIN ASSEMBLY APPARATUS
Filed June 15, 1960 6 Sheets-Sheet 6
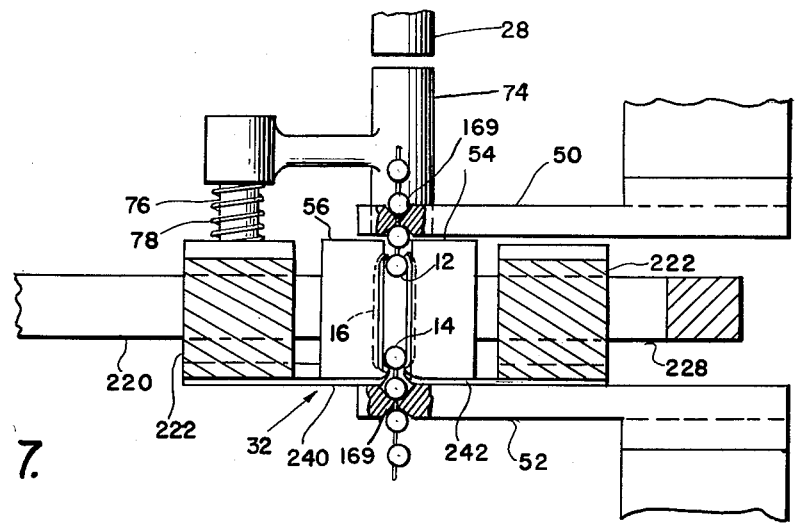
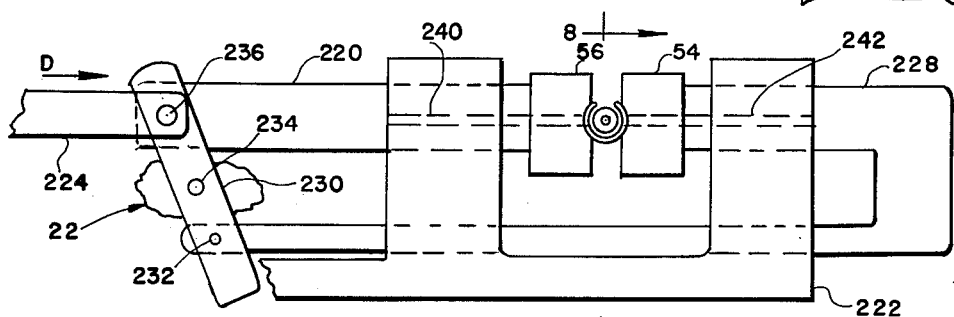
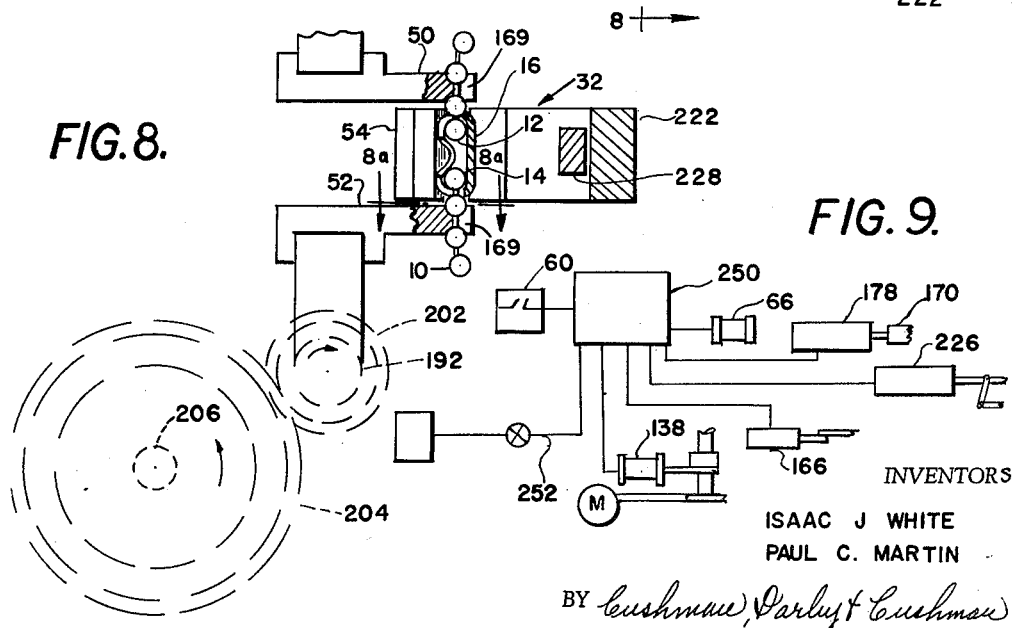
INVENTORS
ISAAC J WHITE
PAUL C. MARTIN
BY Cushman, Darby & Cushman
ATTORNEYS

United States Patent Office 3,046,642
Patented July 31, 1962

3,046,642
AUTOMATIC KEY CHAIN ASSEMBLY
APPARATUS
Isaac J. White, Bethel, and Paul C. Martin, Newtown, Conn.; said Martin assignor to said White
Filed June 15, 1960, Ser. No. 32,242
22 Claims. (Cl. 29—208)

The present invention relates to an apparatus for assembling a key chain or the like and, more particularly, to an apparatus for automatically assembling an article on a bead chain and linking the ends of the chain by inserting the same into a clasp.

While the specification refers to key chain assembly, it will be understood that the invention primarily relates to assembling the bead ends of a predetermined length of bead chain in the usual clasp structure with or without an apertured article provided on the chain. The use of the word "key" is merely for the purpose of description as bead chains of this type are normally used to carry keys such as house keys, door keys, or the like. Often times such bead type chains are provided with articles thereon, the articles being identification tags, nail clippers, charms, and the like.

Heretofore bead chains have been manually cut to predetermined lengths from a reel or spool. After cutting, the bead chain was manually threaded through an aperture in the article to be assembled thereon and then the two end beds of the chain were snapped into a preformed clasp or terminal. The purchaser of the item could detach one end bead and insert onto the chain a key or any other article so desired, A primary object of the present invention is to provide an apparatus which will automatically meter out a predetermined length of bead chain, sever the predetermined length, and orient the end beads into a partially preformed clasp and crimp the clasp about the end bead.

Another object of the present invention is to provide an apparatus for assembling the ends of a bead chain into a clasp, the bead chain being previously automatically threaded through an aperture in the article desired to be supported.

A further object of the present invention is to provide an apparatus for assembling a bead chain and clasp, the apparatus being completely automatic and provided with a sequence of operation which is rapid and positive, thereby permitting the effective assembly in less time and with less handling than heretofore known.

Still another object of the present invention is to provide an apparatus having improved means for engaging a length of bead chain and holding the end beads in a predetermined position as the end beads are oriented or moved into a clasp.

Ancillary to the preceding object, it is a further object of the present invention to provide improved means of crimping the terminal clasp about the end beads of a bead chain to form the assembled article.

These and other objects and advantages of the present invention will appear more fully in the following specification, claims and drawings in which:

FIGURE 4 is an enlarged fragmentary side elevational view of the assembly station and illustrating the bead chain being oriented into the clasp;

FIGURE 5 is an enlarged front elevational view of the assembly station of the apparatus of the present invention and showing the feeding of a predetermined length of the bead chain to the bead chain pick-up fingers;

FIGURE 6 is an enlarged fragmentary view, partly in section, of the clasp crimping station forming part of the assembly station and illustrating a clasp being crimped onto the end beads of the bead chain;

FIGURE 7 is a fragmentary top plan view of the crimping station of FIGURE 6 and illustrating the crimping jaws crimping the partially preformed clasp about the end beads of a bead chain;

FIGURE 8 is a sectional view taken substantially on the line 8—8 of FIGURE 7 at the crimping station and showing in addition the bead chain pick-up fingers orienting the end beads of a predetermined length of chain into a clasp;

FIGURE 8b is a fragmentary end elevational view of the pick-up finger of FIGURE 8a and is taken substantially on the line 8b—8b of FIGURE 8a;

FIGURE 9 is a schematic diagram illustrating the sequence of operation of the various operating means for the apparatus of the present invention;

FIGURE 10 is a fragmentary sectional view taken substantially on the line 10—10 of FIGURE 5;

FIGURE 11 is a fragmentary perspective view of the clasp feed chute and illustrating the escapement mechanism for feeding a single clasp to the clasp crimping station; and FIGURE 12 is a view illustrating a bead chain clasp and article assembled by the apparatus of the present invention.

*General Construction and Operation*

Figure 1:
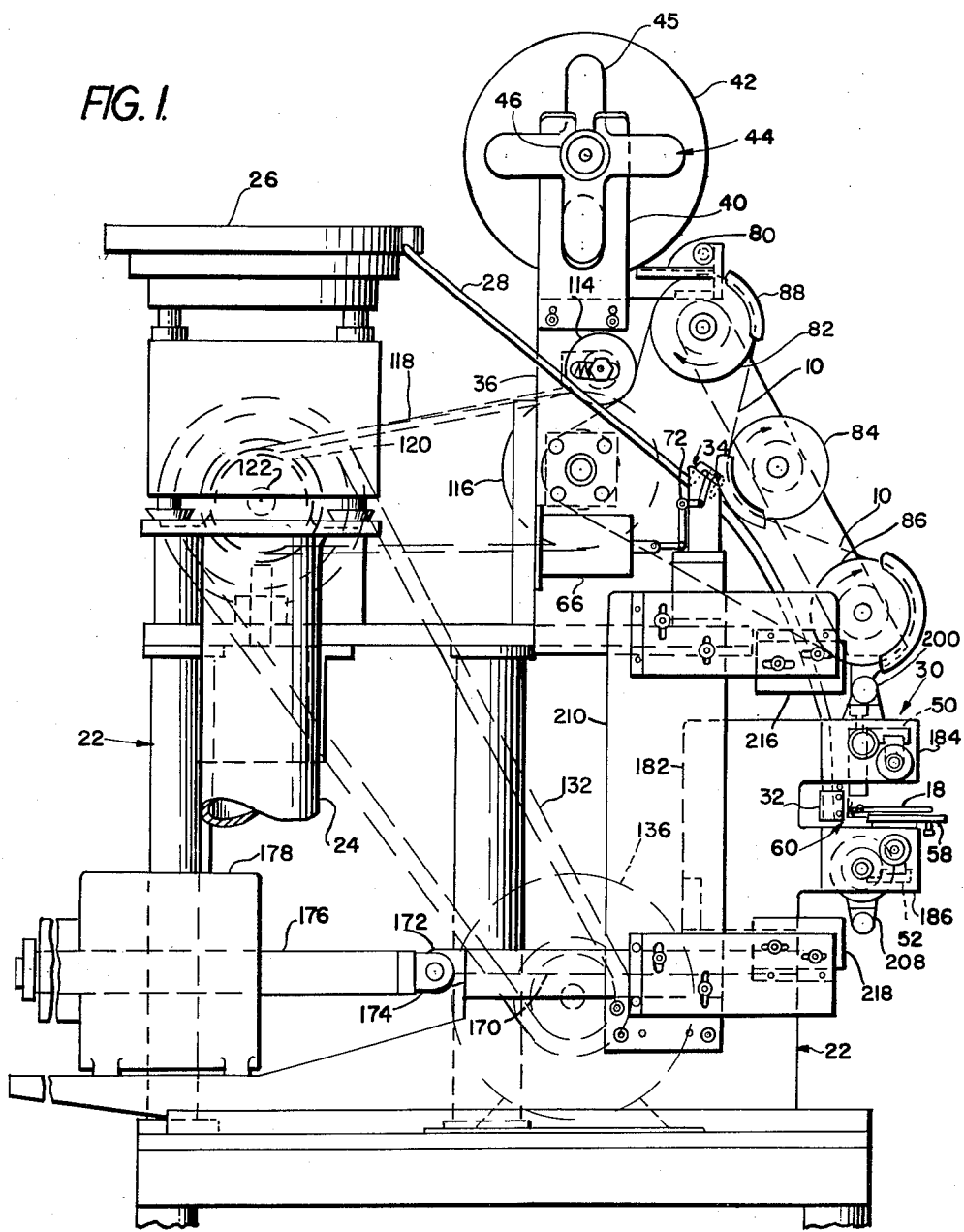
FIGURE 1 is a side elevational view of the apparatus of the present invention.
Figure 2:
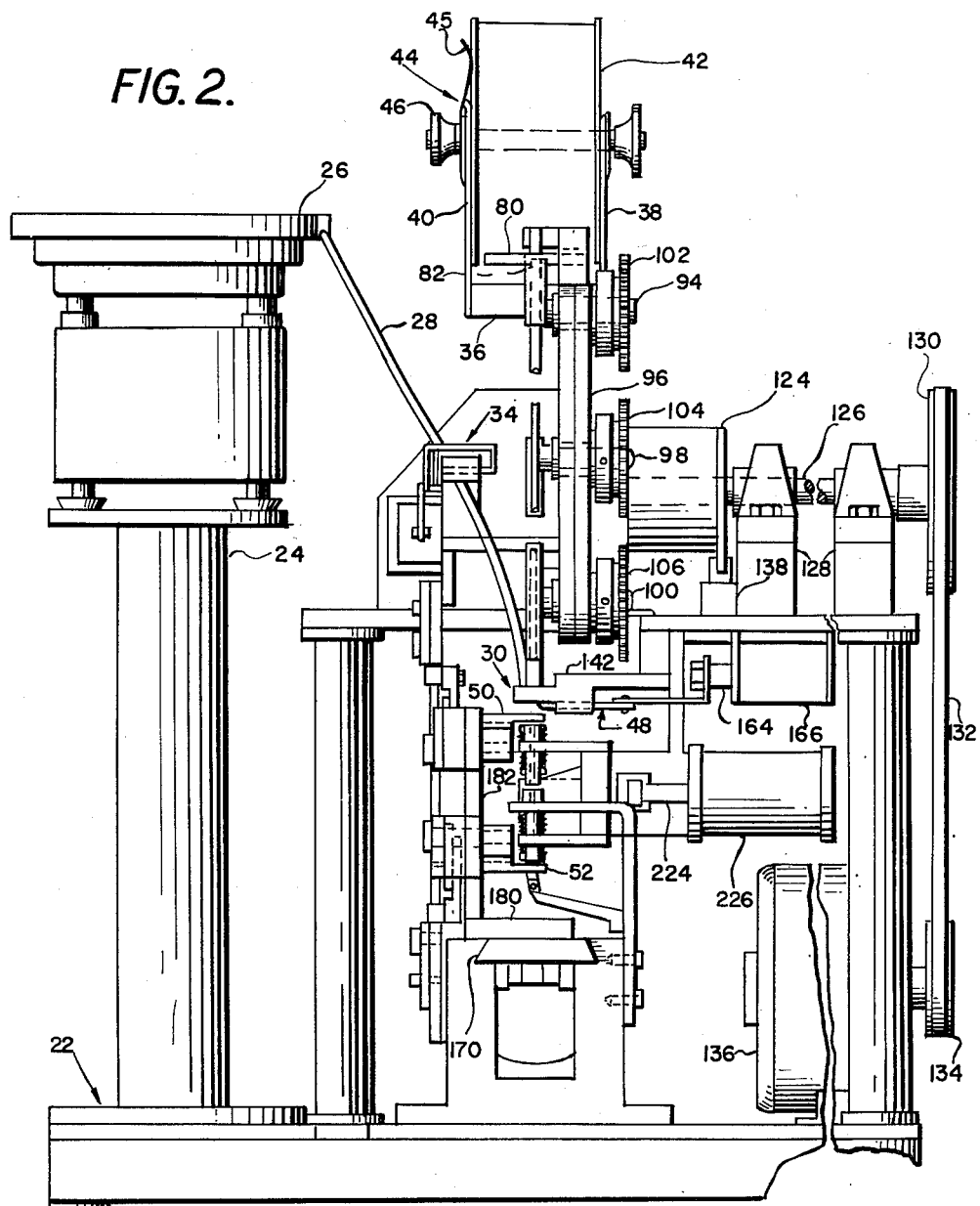
FIGURE 2 is a front elevational view of the apparatus shown in FIGURE 1 and looking from the right toward the left.
Figure 3:
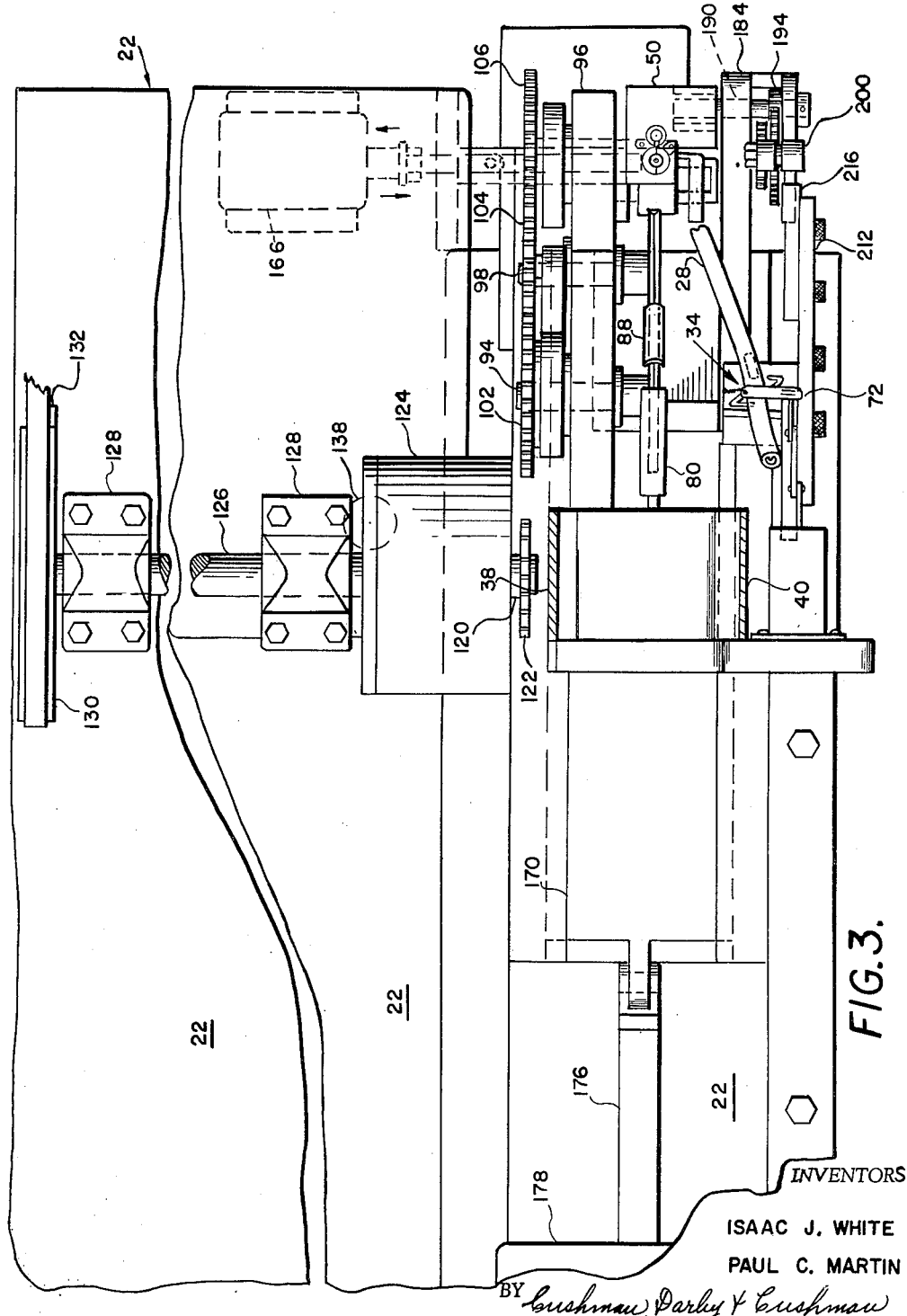
FIGURE 3 is a top plan view of the apparatus of FIGURE 1 on a slightly larger scale, parts of the apparatus being omitted for the purpose of clarity.

Referring now to the drawings wherein like characters or reference numerals represent like or similar parts, the apparatus of the present invention is best shown in FIGURES 1, 2 and 3. The purpose of the apparatus is to automatically assemble a bead chain with its end beads supported in a clasp or terminal. As best shown in FIGURE 12, the bead chain assembled by use of the apparatus of the present invention includes a predetermined length of bead chain 10 having its end beads 12 and 14 placed within a clasp 16, the clasp 16 being preformed and crimped to the desired shape about the beads 12 and 14. Any article 18 such as the name tag shown in FIGURE 12 may have the bead chain 10 threaded through an aperture 20 therein prior to the placing of the end beads 12 and 14 into the clasp 16. After the bead chain is assembled as shown in FIGURE 12, the user of the bead chain may detach one of the beads in a known manner from the clasp and insert keys or other articles on the chain 10 and then reinsert the bead 12 back into the clasp .

The apparatus for performing the automatic assembly of the above mentioned bead chain and clasp includes a stationary frame structure generally designated at 22 upon which is mounted the various operating elements for completing the automatic operation to be hereinafter described. In more detail, the frame structure 22 is provided with a standard or post 24 upon which is mounted a conventional type of rotary or vibratory hopper 26 for orienting and feeding clasps to a clasp tube or chute 28. The clasp tube 28 descends to an assembly station generally designated at 30 where a clasp receiving mechanism 32 is provided. The clasps 16 which are partially preformed so as to provide for easy insertion of the end beads of the bead chain are fed down the tube 28 by gravity to an escape mechanism 34 and from the position of escapement mechanism 34 the clasps are fed one by one as needed to the clasp receiving mechanism.

Also carried on the stationary frame structure 22 is a spool support 36 having a pair of arms 38 and 40 for supporting a spool 42 carrying the bulk bead chain 10. A friction brake 44 having spool engaging fingers 45 is provided on the spool support 36, the friction brake being adjusted by the hand knobs 46 so as to provide the necessary back pressure to hold the bead chain snug during the cycle of operation. The bead chain 10 which is shown in broken lines in FIGURE 1 is threaded to the assembly station 30 adjacent the clasp receiving mechanism 32. A knife structure 48 is provided at the assembly station 30 and is adapted to sever off a predetermined length of the bead chain 10 immediately after the bead chain 10 is picked up by a pair of pick-up fingers 50 and 52 respectively moving transversely with respect thereto. The pick-up fingers are adapted to engage the piece of bead chain 10 to be severed adjacent each of its end beads and move the end beads toward a clasp held in the clasp supporting mechanism 32, the fingers so orienting the end beads that they are deposited into the clasp. Once the end beads of the chain 10 have been deposited into a clasp, the clasp receiving mechanism 32 which is provided with a pair of crimping jaws 54 and 56 (FIGURES 6 and 7) is actuated to crimp the clasp around the two end beads. When this operation is completed the bead chain with its clasp is stripped from the assembly station and the cycle of operation is then repeated to form another assembled bead chain.

It will be noted in FIGURE 1 that an article support 58 carried by the stationary frame structure 22 is provided for supporting an article 18 through which the bead chain is threaded when a predetermined length of bead chain is metered from the spool 42 to the assembly station 30. If desired, a micro-switch 60 may be provided adjacent the article support 58 and the placing of an article 18 on the article support is adapted to engage and close the micro-switch setting into action the operation of a complete cycle including the metering of a predetermined length of the bead chain 10, the feeding of a clasp 16 to the clasp receiving mechanism 32, the pick-up of the end balls of the bead chain 10 as the length of chain is severed, and the orientation of the bead chain to deposit the end beads into the clasp so that the clasp may be crimped about the same. A more detailed description of the various operations of the elements which make up the apparatus of the present invention will follow under the individual headings (1) Clasp Feed, (2) Bead Chain Feed, (3) Bead Chain Cut-Off and Bead Chain Carrying Device, (4) Clasp Crimping Device, and (5) Cycle of Operation.

Clasp Feed

Referring now to FIGURES 1, 2, 3 and 11, it will be noted that the clasps 16 are placed in bulk in the hopper or bowl 26 and as the bowl vibrates or rotates, the clasps are automatically orientated so that they may be fed successively down the tube or chute 28 by gravity. The tube or chute 28 is provided with an internal guide blade 62 (FIGURE 11) which is adapted to orient the clasp 16 and properly position the same in the clasp receiving mechanism 32.

At an intermediate point along the tube or chute 28 the escapement mechanism 34 is provided for feeding one clasp at a time by gravity to the clasp receiving mechanism 32. The escapement mechanism 34 includes a double prong device 64 (FIGURE 11), which is actuated by a solenoid 66 suitably supported on the stationary frame structure 22. The double prong mechanism 64 has one prong 68 arranged to pass through the tube 28 below another prong 70. Suitable operating linkage 72 (FIGURE 1) operatively connecting the double prongs 68 and 70 to the solenoid is so arranged to reciprocate the prongs 68 and 70 so that when one prong is blocking the tube the other prong is withdrawn from the tube. As will now be evident, upon actuation of the solenoid, the prong 68 as shown in FIGURE 11 will be withdrawn from the tube and simultaneously as it is withdrawn the prong 70 enters the tube. The prong 68 will permit the clasp 16 immediately thereabove to feed by gravity to the clasp receiving mechanism 32 whereas the prong 70 will retain the other clasps in the tube or chute 28. When the solenoid 66 is de-energized, the prong 70 will be withdrawn from the tube just as the prong 68 enters the tube and a new clasp 16 will come to rest on the prong 68 ready for feeding to the clasp receiving mechanism 32 upon actuation of the solenoid 66.

The lower end of the clasp feeding tube 28 is provided with a pivotal section 74 (FIGURE 6) which is mounted on a pivot 76 suitably carried on the stationary frame structure 22. A spring 78 is adapted to act on the section 74 so that it is normally urged to a position in direct alignment with the upper section of the tube 28 and the clasp receiving mechanism 32 as shown in the dotted lines. The purpose of the section 74 will be obvious later in the specification. For the present, it will suffice to say that the upper pick-up finger 50 for the bead chain during its motion to deposit the end bead 12 in the clasp 16 passes across the area where the section 74 of tube 28 is arranged and will engage the section 74 to pivot the same about the pivot 76 to a position where the section 74 does not interfere with the depositing of the end bead 12 in the clasp 16. When the finger 50 is withdrawn to its normal chain receiving position, section 74 of the tube 28 is returned by spring 78 to a position so as to be aligned with the clasp receiving mechanism 32.

Bead Chain Feed

As mentioned hereinabove the bead chain 10 comes in bulk on the spool 42 which is carried on the stationary frame structure 22 by the pair of arms 38 and 40. The chain 10 is fed from the spool 42 in a counter clockwise direction as viewed in FIGURE 1 beneath a guide 80 and about a bead chain drive sprocket 82 (FIGURE 4) suitably carried on the stationary frame 22. The chain 10 is threaded successively about a second drive sprocket 84 and a third drive sprocket 86, each of which is suitably mounted on the stationary frame structure 22. Guides 88, 90 and 92 hold the chain 10 respectively in the sprockets 82, 84 and 86. As best shown in FIGURE 4 the sprockets 82, 84 and 86 rotate in the direction of the arrows A, B and C, respectively, each of the sprockets having cooperating periphery configurations to receive the beads of the chain 10 and thus when the sprockets are rotated a pull will be exerted on the chain.

Referring to FIGURE 2 it will be noted that the sprocket 82 is carried on a shaft 94 mounted on a member 96 supported by the frame structure 22. The sprocket 84 is carried on the shaft 98 also rotatably supported in the member 96 whereas the sprocket 86 is carried on a shaft 100 rotatably supported in the member 96. The bead chain sprockets 82, 84 and 86 are driven respectively by the drive sprockets 102, 104 and 106 about which passes a drive pulley 108 (FIGURE 4). The drive pulley 108 also passes about a sprocket 110 carried on a shaft 112 suitably supported on the stationary frame structure 22. An idler sprocket 114 suitably spring urged toward and engaging the drive pulley 108 provides the proper tension for the drive pulley 108. Also mounted on the shaft 112 is a sprocket 116 which is driven by a chain or belt 118 passing about a sprocket 120 (FIGURE 1), carried on the driven shaft 122 of a one revolution clutch 124. The one revolution clutch 124 is mounted on a jack shaft 126 suitably carried by the bracket member 128 (FIGURE 2) on the stationary frame structure 22. A pulley or drive sprocket 130 carried on the outer end of the jack shaft 126 is driven by a V-belt 132 passing around a drive pulley 134 of a continuously driven motor 136.

The one revolution clutch 124 is operated by actuation of a solenoid 138 (FIGURES 2 and 3). The solenoid 138 is a demand type solenoid which is actuated upon closing of the micro-switch 60 when the article 18 is positioned on the article support 58. Upon closing of the micro-switch 60 the solenoid 138 releases the one revolution clutch 124 which in turn causes a predetermined length of chain 10 to be metered from the spool 42 about the sprockets 82, 84 and 86 to the assembly station 30.

The chain 10 after it passes from the lowermost sprocket 86 enters a short feed tube 140 carried in an anvil 142 of the knife mechanism 48. Immediately beneath the feed tube 140 and aligned therewith are a pair of locating bead chain tubes 144 and 146 suitably supported on a portion of the stationary frame structure 22. Each of the locating tubes 144 and 146 are made in split segments 148 and 150 as best shown in FIGURES 5 and 10. The split segments 148 and 150 are normally urged toward the position shown in FIGURE 10 by the springs 152, and as will be described later in the specification may be urged apart when the bead chain 10 is stripped therefrom. Immediately below the lower locating tube 146 is a retainer spring 154 (FIGURE 5) suitably carried on the stationary frame structure 22 and adapted to cooperate with the lower pick-up finger 52. As will be evident later in the specification the retainer spring 154 is adapted to urge the lower free end of bead chain 10 into the pick-up finger 52 when the pick-up finger is actuated in its sequence of operation.

From the above description, it is now evident that when an article 18 engages the microswitch 60 the one revolution clutch 124 is released by the energizing of the solenoid 138 so that a predetermined length of bead chain 10 is fed through the tubes 140, 144 and 146, the end bead of the bead chain 10 extending to a point immediately below the lower end of the lower locating tube 146.

*Bead Chain Cut-Off and Bead Chain Carrying Device*

Referring now to FIGURES 2 and 5, the knife mechanism 48 for severing the predetermined length of chain includes the stationary anvil 142, which supports the lower end of the feed tube 140 and a guillotine type of knife blade 160 which is adapted to reciprocate across the anvil to sever the chain intermediate two adjacent beads. The knife blade 160 is connected by means of an arm 162 to a plunger 164 of an air cylinder 166. The air cylinder 166 is energized in timed sequence with the actuation of the one revolution clutch 124 so as to sever the chain immediately after the predetermined length of chain has been metered to the assembly station 30.

Immediately prior to the severing of the bead chain 10 by the blade 160, the bead chain 10 is picked up by actuation of the pick-up fingers 50 and 52 respectively. Each of the fingers 50 and 52 is provided with notches 169 (FIGURE 6) and since the fingers move transverse to the movement of the blade 160 once the chain is picked up by the fingers 50 and 52 the portion of the chain in between the fingers is relatively taut so that the knife blade 160 can sever the predetermined length of bead chain.

Referring now to FIGURES 1, 4 and 5 it will be noted that a gib 170 is slidably mounted in the stationary frame structure 22. The gib 170 is provided with a clevis 172 which is connected by a suitable clevis pin to a yoke 174 of a piston arm 176 of an air cylinder 178. Actuation of the air cylinder 178 from the position shown in FIGURE 1 will move the gib 170 to the left thereof to a position such as shown in FIGURE 4. Mounted on the gib 170 for movement therewith is a carrier member 180 which has an upstanding bracket member 182 provided with arms 184 and 186. Bracket member 182 is adapted to pivotally support the fingers 50 and 52 on the arms 184 and 186 respectively as best shown in FIGURES 4 and 5. The arm 50 is mounted on a shaft 190 extending through the arm 184 whereas the finger 52 is carried on the pivot shaft 192 extending through the arm 186. A small gear 194 carried on the shaft 190 meshes with a gear 196 pivotally mounted on a shaft 198 (FIGURE 4) also extending through arm 184. The shaft 198 carries a cam follower 200. The shaft 192 which carries the finger 52 is provided with a small gear 202 which meshes with a gear 204 carried on a shaft 206 extending through arm 186. A cam follower 208 is adapted to rotate the shaft 206 and the gear 204 to pivot the finger 52 about the shaft 192.

Carried on the stationary frame structure 22 is a main mounting bracket 210 on which is mounted the vertically adjustable plates 212 and 214. Plates 212 and 214 carry horizontally adjustable cams 216 and 218 respectively. The cams 216 and 218 are adapted to cooperate with the cam followers 200 and 208 respectively to pivot the fingers from the position shown in FIGURE 1 to the position shown in FIGURE 4 where the end beads picked up by the fingers are looped about and deposited into the clasp 16 supported in the clasp receiving mechanism 32. However, it will be appreciated that from the first movement of the bracket 182 from the position shown in FIGURE 1 the fingers 50 and 52 do not pivot but move toward the left of FIGURE 1 to a position where they respectively engage the bead chain 10 at spaced points adjacent the ends thereof. Actually after engagement by the fingers 50 and 52, the knife 160 severs the chain and once the chain is severed continued movement of the gib towards the left of FIGURE 1 will cause the cam followers 200 and 208 to engage the cams 216 and 218 respectively to cause pivotal movement of the fingers 50 and 52 about their respective pivotal axis. During the first portion of the movement of and pivoting of the fingers 50 and 52, the chain begins to strip from the guide tubes 144 and 146. The fingers will pivot a full 180° from the position shown in FIGURE 1 to the position shown in FIGURE 4 or FIGURE 8 where the end beads are deposited into a previously positioned clasp 16.

During the first position of the movement of the gib 170 from the right toward the left, the retainer spring 154 cooperates with the lower finger 52 to wipe the lower end of the bead chain 10 into the notch 169. Since the upper portion of the chain 10 which is engaged by the upper finger 50 extends through the anvil 142 and upper locating tube 144, there is no necessity to provide a retainer spring to sweep the chain into the notch 169 of finger 50.

*Clasp Crimping Device*

Figure 8A:
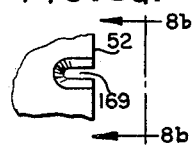
FIGURE 8a is a fragmentary plan view of one of the pick-up fingers taken substantially on the line 8a—8a of FIGURE 8.
Figure 8B:
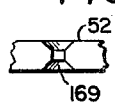

FIGURES 6, 7 and 8 best illustrate the clasp crimping device which forms a part of the clasp receiving mechanism 32. In more detail, the clasp crimping device includes the pair of opposed jaws 54 and 56 which are adapted to support a clasp in a vertical position as it is received from the clasp chute 28. The crimping jaw 56 is carried on an arm 220 slidably mounted in a bracket 222 carried on the stationary frame structure 22. The arm 220 is pivotally connected at one end to an actuating lever 224 which forms part of the piston plunger for an air cylinder 226 suitably supported on the stationary frame structure 22. Jaw 54 which opposes jaw 56 is mounted on a J-shaped bracket 228 also slidably mounted in the bracket 222. The free end of the slidable bracket 228 is pivotally connected to a cross arm 230 as indicated at 232, the cross arm 230 being pivoted to the stationary frame structure 22 at 234. The cross arm 234 is also pivoted to the arm 220 and lever 224 as indicated at 236.

The stationary bracket member 222 is provided with a pair of fixed blades 240 and 242 which extend inwardly toward each other and terminate immediately beneath the jaw members 54 and 56. The blades 240 and 242 provide the lower end support for a clasp 16 when it is fed to the clasp receiving mechanism 32 and the jaws 54 and 56 cooperate therewith when open to provide a nest for the clasp.

When the end beads 12 and 14 of the bead chain 10 are positioned within the clasp 16 by the fingers 50 and 52, the air cylinder 226 is actuated to move the lever arm 224 in the direction of the arrow D in FIGURE 7. This movement causes the jaws 54 and 56 to move toward one another because of the toggle mounting of the same. The jaws engage the sides of the clasp and crimp the same about the end beads to complete the assembly operation of the bead chain and clasp.

After the jaws 54 and 56 have been moved toward each other by actuation of the air cylinder 226, they will be moved apart from one another by retraction of the lever 224. However, during the operation of the crimping jaws 54 and 56, the fingers 50 and 52 will be still moving from the right toward the left of FIGURE 4 as the gib 170 and carrier 180 carrying the same is still being moved by the actuation of the air cylinder 178. Prior to release of the jaws 54 and 56 to open position, the continued linear movement of the fingers 50 and 52 toward the left of FIGURES 4 and 8 cause the chain to be stripped from the fingers 50 and 52. The cycle of operation is completed when the jaws 54 and 56 open to release the crimped clasp so that the completed chain can be removed. Then the gib 170 and carrier 180 together with the pick-up fingers 50 and 52 moves from the left to the right of FIGURE 4 so that the fingers 50 and 52 can return to the position of FIGURE 1 where they are ready for another cycle of operation. The second cycle of operation will begin upon placing of an article 18 on the article supporting member 58 so that the micro-switch 60 is closed.

Operation

Referring to FIGURE 9, a schematic diagram is shown illustrating the sequence of operation of the various operating means for the apparatus of the present invention. In more detail, it will be noted that the micro-switch 60 is adapted to operate a timer generally designated at 250. The timer sets into operation the various operating means for proper sequence of operation of the apparatus. An air line 252 from a source of compressed air leads to the timer 250 and suitable valves within the timer are operated in timed sequence so as to actuate the air cylinders 166, 178 and 226. The timer is also provided with means for energizing the solenoids 66 and 138 in timed sequence.

Assuming an article is placed on the article supporting member 58, the micro-switch 60 is closed and the timer 250 begins one complete cycle of operation. First the solenoid 138 is energized so that its plunger is withdrawn from the one-way clutch 124 to thereby permit the clutch to actuate the bead chain sprockets 82, 84 and 86 so as to meter a predetermined length of the bead chain to the assembly station 30. Simultaneously with the actuation of the one revolution clutch 124, the solenoid 66 is energized to actuate the escapement mechanism 34 to thereby permit one clasp to fall by gravity through the lower portion of chute 28 into the clasp receiving station 32. After the proper length of chain has been fed and a clasp has been positioned in the clasp receiving station, the timer then actuates an air valve to start movement of the piston in air cylinder 178. This causes the gib 170, carrier 180 and the bracket 182 to move from the right toward the left of FIGURE 1 carrying with them the pick-up fingers 50 and 52. During the first portion of the movement of gib 170, the fingers 50 and 52 have a linear motion transverse to the axis of the bead chain 10 at the assembly station 30. As soon as the fingers engage the bead chain 10, the air cylinder 166 is actuated by the timer 250 to cause the knife mechanism 48 to sever the desired length of bead chain. Air cylinder 178 continues its movement and eventually the fingers are pivoted on a horizontal axis with respect to the supporting bracket 182 as the cam followers of the fingers engage the cams on the stationary frame structure 22. This causes the ends of the bead chain to be moved toward each other and into a position where the end beads are deposited within a previously positioned clasp 16. Immediately after depositing the end beads of the chain within the clasp 16, the air cylinder 226 is actuated causing its piston arm to move the crimping jaws 54 and 56 toward one another and crimp the clasp about the chain. While the jaws are crimping the clasp, the air cylinder 178 is still moving the gib 170 toward the left of FIGURE 1 causing the chain to be stripped from the holding fingers 50 and 52. After the chain has been stripped from the pick-up fingers and the guide tubes, the jaws 54 and 56 open and the completed chain assembly is removed from the machine. The air cylinder 178 then returns to gib 170 and the pick-up fingers to a position for receiving the next length of chain. The apparatus is then ready for another cycle of operation.

It is thus seen that the objects and advantages of this invention have been fully and effectively accomplished by the apparatus illustrated in the drawings and described hereinabove. However, the foregoing specific embodiment of the apparatus is subject to some changes without departing from the principles of the invention involved. For this reason, the terminology used in this specification is for the purpose of description and not limitation, the scope of the invention being defined in the appended claims.

We claim:

1. In an apparatus for assembling the ends of a predetermined length of bead chain in a clasp: a source of supply for the bead chain, a frame structure having an assembly station, means carried by said frame structure for feeding a predetermined length of bead chain having a free end from said source of supply to the assembly station, means carried by said frame structure at the assembly station and operative after said feeding means has fed the predetermined length of bead chain thereto for grasping said bead chain adjacent said free end and at a spaced location adjacent a point at which said bead chain is to be severed into the predetermined length, means carried by said frame structure and operative after said grasping means grasps said bead chain for severing said bead chain, a clasp receiving means carried by said frame structure at the assembly station for receiving a clasp, means operatively associated with said grasping means for moving the same, said last-mentioned means being operative to move said grasping means with the severed length of bead chain to a position where free ends of the severed length of bead chain are positioned in said clasp, and means positioned adjacent said clasp-receiving means and operative to engage and crimp said clasp about the free ends of said length of bead chain.

2. The apparatus of claim 1 in which said grasping means includes a pair of fingers movable transverse to the length of bead chain at the assembly station until said bead chain is grasped at the spaced points, and means to pivot said fingers toward each other after said bead chain is severed, said last mentioned means being arranged to pivot said fingers to the position where the ends of said severed length of chain are positioned in said clasp.

3. The apparatus of claim 1 wherein said clasp crimping means includes crimping jaws movable toward and away from each other and cooperating with said clasp receiving means to hold said clasp in a chain receiving position.

4. The apparatus of claim 1 including a chain guide tube member positioned at said assembly station for holding the predetermined length of chain fed prior to engagement by said grasping means, said guide tube member including yieldable sections adaptable to be opened when said grasping means is moved by said moving means so that the severed length of bead chain may be stripped therefrom.

5. The apparatus defined in claim 4 including an article supporting platform positioned at said assembly station and adapted to support an apertured article with the aperture of the article in alignment with said guide tube member whereby the length of bead chain fed to the assembly station passes through the aperture in the article.

6. In an apparatus for assembling the free ends of a predetermined length of bead chain in a clasp after the bead chain has been threaded through an aperture in an article: a source of supply for the bead chain, a source of supply of clasps, a frame structure having an assembly station for receiving a predetermined length of bead chain, a clasp, and an article, means at said assembly station for supporting the article, means carried by said frame structure for feeding a predetermined length of said bead chain from said source, said means feeding a free end of the bead chain through the aperture in the article, means at said assembly station and operative after said feeding means for grasping the bead chain on each side of said article, said grasping means including means engaging the bead chain adjacent its lower free end and means engaging the bead chain at a position above the article where said bead chain is to be severed into the predetermined length, means operative after said grasping means has grasped said bead chain for severing the bead chain above said grasping means at a point where at least one bead is entirely exposed, clasp-receiving means including supporting means at said assembly station for receiving the clasp, means operatively associated with said grasping means for moving the same, said last-mentioned means being operative to move said grasping means with the severed length of bead chain to a position where free ends of the severed length of bead chain are positioned in the clasp supported by said clasp-receiving means, and means operable after the free ends of the severed piece of bead chain are positioned in said clasp for engaging and crimping said clasp about the free ends of the severed predetermined length of bead chain.

7. The apparatus of claim 6 wherein said severing means includes a stationary anvil and a movable guillotine blade cooperating therewith, said stationary anvil being provided with a hole therethrough through which said bead chain is fed and said movable blade being moved in a direction transverse to a direction of movement of said grasping means.

8. The apparatus of claim 6 wherein said clasp crimping means includes crimping jaws movable toward and away from each other and positioned above said clasp supporting means and cooperating with the same to hold said clasp in a chain receiving position.

9. The apparatus of claim 6 wherein said means engaging the bead chain adjacent its lower free end includes a pivotally mounted finger and wherein said means engaging the bead chain at a position above the article includes a second pivotally mounted finger, said moving means for said grasping means including cam means cooperating with said first and second fingers to pivot the same toward one another and to the position where the ends of the severed piece of bead chain are positioned within said clasp.

10. The apparatus of claim 9 wherein said moving means includes means to move said first and second fingers transversely with respect to the axis of said bead chain prior to engagement of said first and second fingers by said cam means.

11. The apparatus of claim 10 including a pair of tubular guide members aligned with each other, one of said guide members being positioned above said article support means and the other of said guide members being positioned below said article support means, said guide members being adapted to receive the bead chain when fed, and said guide members each including a pair of yieldable sections adapted to be opened when said grasping means is moved by said moving means so that the severed piece of bead chain is stripped therefrom.

12. The apparatus of claim 9 wherein said first and second fingers are each provided with a bead chain receiving notch and wherein a retainer spring is provided adjacent said first finger and in the path of movement of the same for urging the free end of said bead chain into the notch.

13. In an assembly station for assembling the free ends of a length of bead chain into a clasp: a frame structure, a clasp-receiving means carried by said frame structure for holding the clasp in a predetermined position, a pair of pivotally mounted fingers operatively carried by said frame structure for supporting the length of bead chain adjacent its free ends in a substantially straight condition and with at least one bead exposed on each of its ends, said clasp-receiving means being positioned intermediate the pivotal axes of said pair of pivotally mounted fingers, means carried by said frame structure and movable with respect to said clasp-receiving means, said last-mentioned means pivotally carrying said fingers and simultaneously moving said fingers and the ends of the length of bead chain supported thereby in a path transverse to the longitudinal axis of said length of bead chain, said last-mentioned means including means to cause said fingers to pivot toward each other and toward said clasp to a position depositing the exposed end beads of said length of bead chain into said clasp.

14. The assembly station of claim 13 in which said clasp receiving means includes means to crimp said clasp about the end beads of said bead chain after said fingers have been moved by said pivoting means.

15. The assembly station of claim 14 wherein said crimping means includes a pair of crimping jaws movable toward and away from each other on an axis transverse to an axis of a clasp held therebetween.

16. The assembly station of claim 15 wherein said crimping jaws cooperate with said finger moving means to strip said length of bead chain from said fingers after said clasp is crimped.

17. The assembly station of claim 13 including a pair of aligned tubular bead chain guide members for initially receiving said length of bead chain prior to engagement and support by said fingers, said tubular guide members being longitudinally spaced from each other, and an article support member for supporting an apertured article inbetween said guide members with its aperture in alignment with the longitudinal axis of said guide members.

18. The assembly station of claim 17 wherein each of said tubular guide members includes a pair of yieldable sections, said length of bead chain being stripped from said tubular guide members when said fingers move in a path transverse to the longitudinal axis of said length of bead chain.

19. In a machine of the character described: a stationary frame structure, an article support member carried on said stationary frame structure for supporting an apertured article with its aperture in cantilever relationship thereto, upper and lower bead chain tubular guide members carried by said frame structure adjacent to said article supporting member, said upper and lower tubular guide members being adapted to guide a bead chain as it is being threaded through the aperture in an article on said support member, means to feed a predetermined length of bead chain to and through said guide tube members, a clasp receiving means supported on said stationary frame structure adjacent said support member and in spaced relationship to said tube members, means to feed a clasp to said clasp receiving means, a bracket member slidably mounted on said stationary frame structure, a pair of bead chain receiving fingers pivotally supported on said bracket member and adapted to engage the length of bead chain at spaced points, means to move said bracket member and said pair of fingers transversely toward said clasp receiving means, and cam means carried by said stationary frame structure for actuating said fingers and pivoting the same to a position where the end beads of said length of bead chain supported between said fingers are deposited in the clasps supported by said clasp member.

20. The machine of claim 19 wherein said clasp receiving means includes a clasp supporting element and a pair of jaw members carried above said supporting element and movable toward and away from each other, and means to move said jaw elements toward each other to crimp said clasp after said fingers deposit the end beads of said length of bead chain into said clasp.

21. The machine defined in claim 19 wherein said clasp feeding means includes a tube extending from a clasp hopper, escapement means operatively associated with said tube for feeding clasps one by one to said clasp receiving means in timed relationship with said bead chain feeding means.

22. The machine defined in claim 21 wherein said clasp tube is provided at its lower end adjacent said clasp receiving means with a section yieldably pivoted on an axis transverse to the path of movement of said bracket member and wherein at least one of said bead chain fingers engages said pivotable section during its movement to thereby pivot said section clear of the same.

No references cited.